(12) United States Patent
Hery

(10) Patent No.: US 6,318,748 B1
(45) Date of Patent: Nov. 20, 2001

(54) SLIDING TOW BAR BUMPER SYSTEM

(75) Inventor: Guy J. Hery, Troy, MI (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 09/636,425

(22) Filed: Aug. 10, 2000

(51) Int. Cl.$^7$ ........................................ B60D 1/06
(52) U.S. Cl. ......................................... 280/500
(58) Field of Search ........................ 280/500, 501, 280/483, 486, 491.1, 491.2; 293/117

(56) References Cited

U.S. PATENT DOCUMENTS

| | | | |
|---|---|---|---|
| 3,717,362 | * 2/1973 | Johnson | 280/416.1 |
| 3,787,910 | 1/1974 | Taylor | 9/1 T |
| 3,972,544 | 8/1976 | Soot | 280/704 |
| 4,025,010 | 5/1977 | Soot | 248/4 |
| 4,078,827 | * 3/1978 | Pilhall | 280/491.3 |
| 4,109,930 | * 8/1978 | Pilhall | 280/491.4 |
| 4,186,938 | 2/1980 | Youndblood | 280/402 |
| 4,194,755 | 3/1980 | Youngblood | 280/402 |
| 4,405,148 | 9/1983 | Dickerson | 280/491 E |
| 4,577,883 | 3/1986 | Duncan | 280/491 D |
| 4,666,359 | 5/1987 | Parr | 414/485 |
| 5,071,153 | 12/1991 | Duncan | 280/491.4 |
| 5,147,095 | 9/1992 | Duncan | 280/491.4 |
| 5,224,960 | 7/1993 | Duncan | 280/491.4 |
| 5,429,382 | 7/1995 | Duncan | 280/491.4 |
| 5,845,922 | 12/1998 | Warner | 280/493 |
| 6,149,181 | * 11/2000 | Biederman | 280/491.1 |
| 6,189,910 | * 2/2001 | Bartel | 280/491.2 |

* cited by examiner

*Primary Examiner*—Kevin Hurley
(74) *Attorney, Agent, or Firm*—Hayes, Soloway, Hennessey, Grossman & Hage, P.C.

(57) ABSTRACT

A tow bar for connecting a vehicle to an object to be towed which reduces impact related structural damage to the vehicle. The tow bar is positioned within the vehicle bumper wherein the bumper contains a section for concealing the tow bar and wherein the tow bar positioned within the bumper, when in a non-towing mode, is movable relative to the bumper, and wherein the tow bar can also be configured into a non-slidable towing configuration.

15 Claims, 3 Drawing Sheets

SLIDING TOW BAR BUMPER SYSTEM

FIELD OF THE INVENTION

The present invention relates to a bumper tow bar system for an automobile which reduces impact related structural damage to the vehicle.

BACKGROUND OF THE INVENTION

Currently, vehicles having built-in towing capability rely on a system utilizing a solid metallic connection between the ball/tow bar and the vehicle frame. Towing systems according to this design provide a secure and rigid towing arrangement, but have very poor impact protection characteristics. When an impact occurs at the ball/tow bar, i.e. a rear impact, the energy of the impact is transmitted through the rigidly connected ball/tow bar to structural components of the vehicle. Even relatively minor rear impacts may result in distortion of the vehicle frame, producing damage that is very costly to repair.

Furthermore, while there are not currently any impact standard requirements for SUV's, trucks, and vans that correspond to the 5 mph impact standard for passenger cars, it is anticipated that in the near future such safety standards will be instituted. In fact, many original equipment manufacturers are already asking for product designs for built in tow packages that will satisfy low speed impact safety standards, such as the 5 mph impact standard. However, while 5 mph bumpers have been available on passenger cars for some time, such bumpers have not been applicable to vehicles having built-in tow packages. Regardless of the impact characteristics of the bumper, the rigidly fixed ball/tow bar will still continue to transmit energy directly to the frame of the vehicle.

With regards to specific prior art disclosures directed at tow bars in general, attention is directed to the following U.S. Pat. Nos. 3,787,910; 3,972,544; 4,025,010, 4,186,938; 4,194,755; 4,405,148; 4,577,883; 4,666,359; 5,071,153; 5,147,095; 5,429,382; 5,845,922.

What is therefore desired is a towing system that does not transmit energy from an impact directly to the frame of the vehicle. Furthermore, it is desired to have a towing system that allows the application of current impact absorbing bumpers, as known in the art, to vehicles equipped with such towing systems.

SUMMARY OF THE INVENTION

A tow bar for connecting a vehicle to an object to be towed wherein said tow bar is positioned within a vehicle bumper, wherein said bumper contains a section for positioning said tow bar within said bumper and wherein said tow bar positioned within said bumper, when in a non-towing mode, is movable relative to said bumper, and wherein said tow bar can also be configured into a non-slidable towing configuration.

In corresponding embodiment, the present invention relates to a towing system for a vehicle comprising a structural member secured to said vehicle, a bumper disposed adjacent to said structural member, a tow bar disposed within said bumper and slidable within said structural member, said tow bar having a first stop preventing sliding removal from said structural member in the direction of said bumper, and a second stop releasably preventing sliding movement of said tow bar in the direction of said structural member.

BRIEF DESCRIPTION OF THE DRAWINGS

Exemplary embodiments of the invention are set forth in the following description as shown in the drawings, wherein.

DETAILED DESCRIPTION OF THE INVENTION

With reference to the figures, an exemplary embodiment of the sliding, tow bar bumper system consistent with the present invention is shown at 10. The bumper system generally comprises a bumper 12 supported by a structural cross bar 14, therebehind. A tow bar 16 is slidably disposed in the structural cross bar 14, and housed within the bumper 12.

Figure 1:
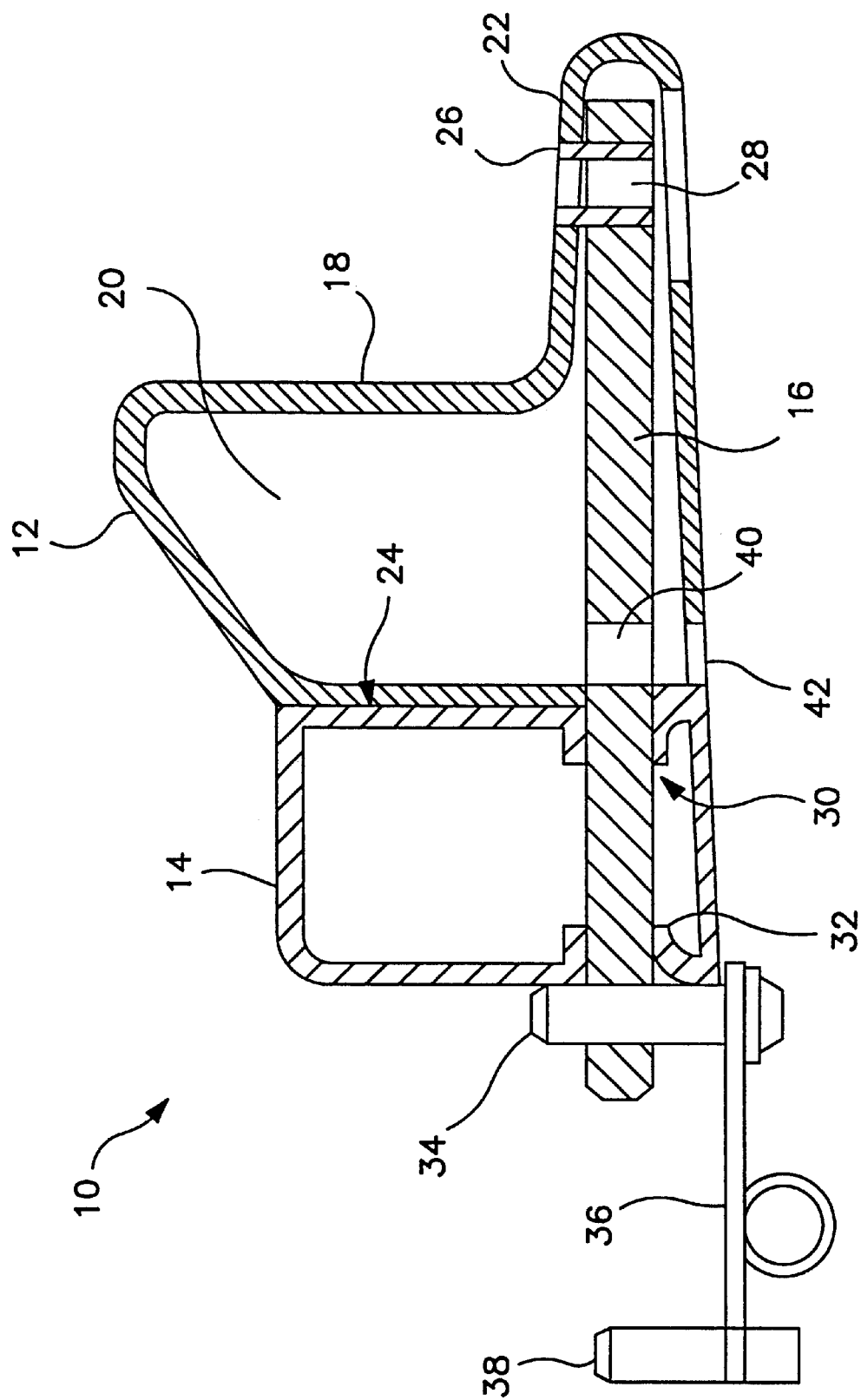
FIG. 1 illustrates in cross-sectional view an exemplary embodiment consistent with the present invention configured in impact energy management condition.

FIG. 1 illustrates the exemplary bumper system 10 in impact energy management condition. The bumper 12 is preferably a molded plastic member, more preferably a molded plastic member having a cosmetic outer surface 18. The bumper 12 may be of the conventional type designed to provide low speed, e.g. 5 mph, impact energy management. The low speed impact energy management characteristics may be improved by an energy absorbing foam or other energy absorbing features disposed on the interior 20 of bumper 12. As shown in FIG. 1, bumper 12 preferably also includes an outward extension 22 providing mounting clearance for a hitch ball. The bumper system 10 also comprises a structural, preferably metallic, cross bar 14. Cross bar 14 is preferably configured as a box beam, although it may alternately be formed as a channel member, a plurality of brackets, etc. The cross bar 14 is preferably disposed transverse to the axis of the vehicle and is secured to vehicle structural members, therein providing the required strength to support and tow a trailer etc.

The cross bar 14 preferably further comprises a bumper attachment face 24 configured to secure the bumper 12 thereto. The bumper 14 may be attached to the cross bar using an adhesive, mechanical fasteners, or other attachment means known in the art.

The final component of the bumper system 10 is a tow bar 16. The tow bar 16 may be housed within, and is preferably concealed by, the bumper 12. The tow bar 16 is preferably an elongated member formed from a structural, preferably metallic, material having sufficient strength to support and tow a trailer etc. The tow bar 16 is coupled to the bumper 12 by a torque sleeve 26. The torque sleeve 26 is a hollow cylindrical member disposed in the hitch ball mounting hole 28 of the tow bar 16. The torque sleeve 26 extends through the hitch ball mounting hole 28 and is secured to the bumper 12, therein coupling the tow bar 16 and the bumper 12 and allowing a hitch ball 46 to be rigidly mounted therethrough without unduly compressing or marring the bumper 12.

The tow bar 16 extends through the bumper 12 and passes through cross bar 14, being slidably retained therein. Slidable retention of tow bar 16 by cross bar 14 is preferably achieved by receiving the tow bar 16 in a passage 30 extending through the cross bar 14. The passage 30 is preferably sized to slidably retain the tow bar 16 while simultaneously minimizing slop or play of the tow bar 16. Minimization of slop or play of the tow bar 16 within the passage 30 may be enhanced by providing the passage 30 with support flanges 32 configured to ride on the tow bar 16.

Pull-out of the tow bar 16 from the passage 30 is prevented by a stop pin 34 attached near the end of the tow bar 16. The stop pin 34 is securely retained to the tow bar 16 by such means as welding, press fit, threaded engagement, etc. Alternately, the stop pin 34 may be replaced by a feature such as a flange on the end of the tow bar 16, a localized thickening of the tow bar 16, etc. The stop pin 34 is disposed on the back side of the cross bar 14, relative to the bumper 12, therein preventing pull out in the direction of the bumper 12 while still allowing sliding displacement in the opposite direction, i.e. in the direction of an impact force.

Pivotally extending from the stop pin 34 is a spring clip 36 formed from a length of resilient material. Disposed on the distal end of the spring clip 36 is a locking pin 38. The length of the spring clip 36 and the dimensions of the locking pin 38 are configured to allow engagement of the locking pin 38 in a locking opening 40 disposed in the tow bar 16, passing through a locking pin orifice 42 in the bumper 12. The locking hole 40 is disposed on the opposite side of the cross bar 14 from the stop pin 34.

Figure 2:
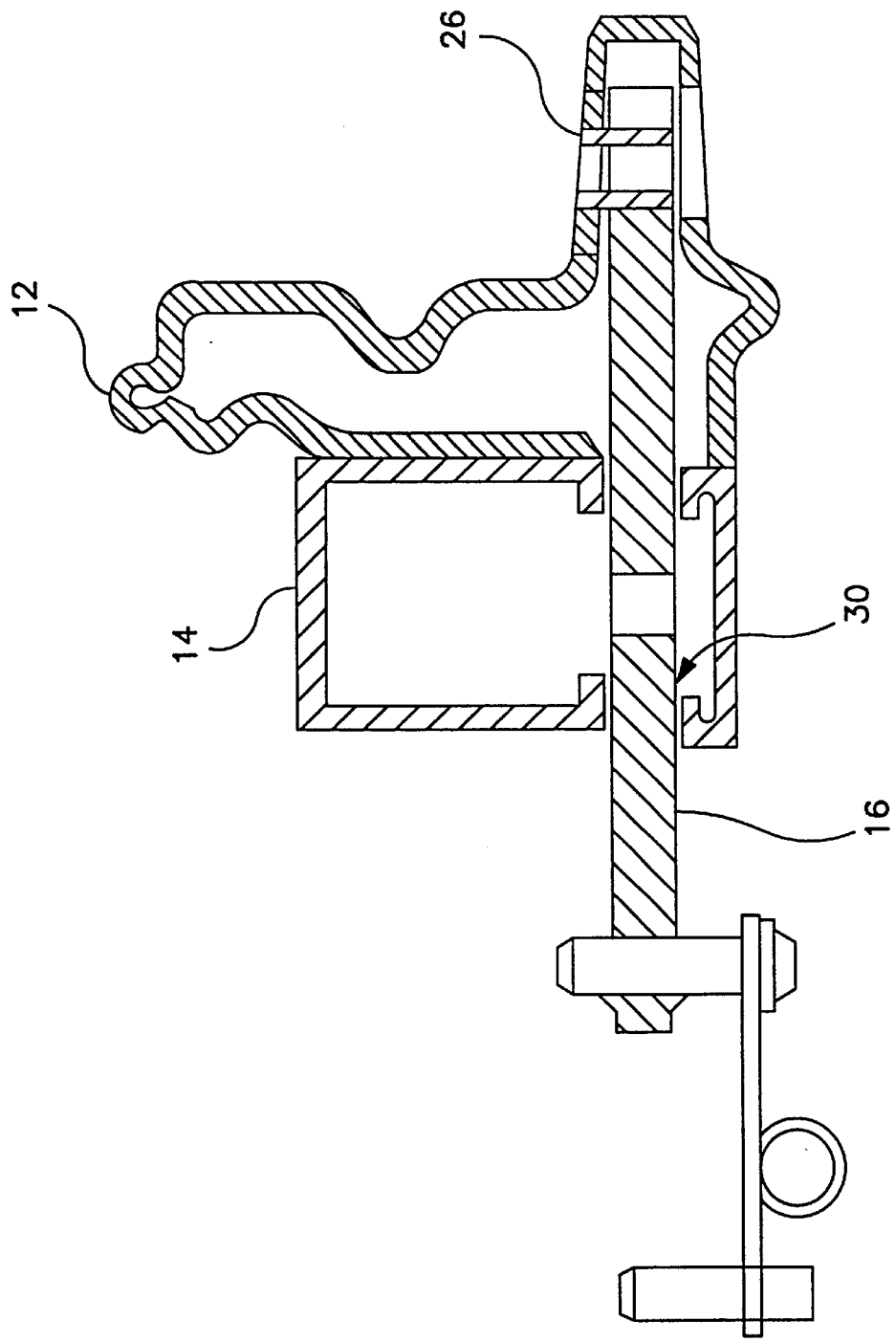
FIG. 2 illustrates in cross-sectional view and exemplary embodiment consistent with the present invention at impact energy management.

FIG. 2 illustrates the exemplary bumper system 10, consistent with the present invention, subsequent to an impact from the energy management configuration shown in FIG. 1. When a bumper system consistent with the present invention receives an impact, e.g. from a low speed collision etc., the energy of the impact is absorbed and dissipated by the bumper 12 with minimal transmission of the impact forces to the structural components of the vehicle, thereby minimizing any damage to the frame or structure of the vehicle. As illustrated in FIG. 2, upon impact the tow bar 16 slides away from the impact through the opening 30 in the cross bar 14. The sliding motion of the tow bar 16 allows the tow bar 16 to be displaced by the impact without transmitting a damaging amount of energy to the cross bar 14, and therein to the structure of the vehicle. As will also be noted in FIG. 2, because the tow bar 16 is able to slide away from the impact, the bumper 12 is able to crumple and deform, therein absorbing the bulk of the energy from the impact. The energy absorbing characteristics of the bumper 12 may further be improved by incorporating an energy absorbing foam or energy absorbing features into the bumper 12.

Figure 3:
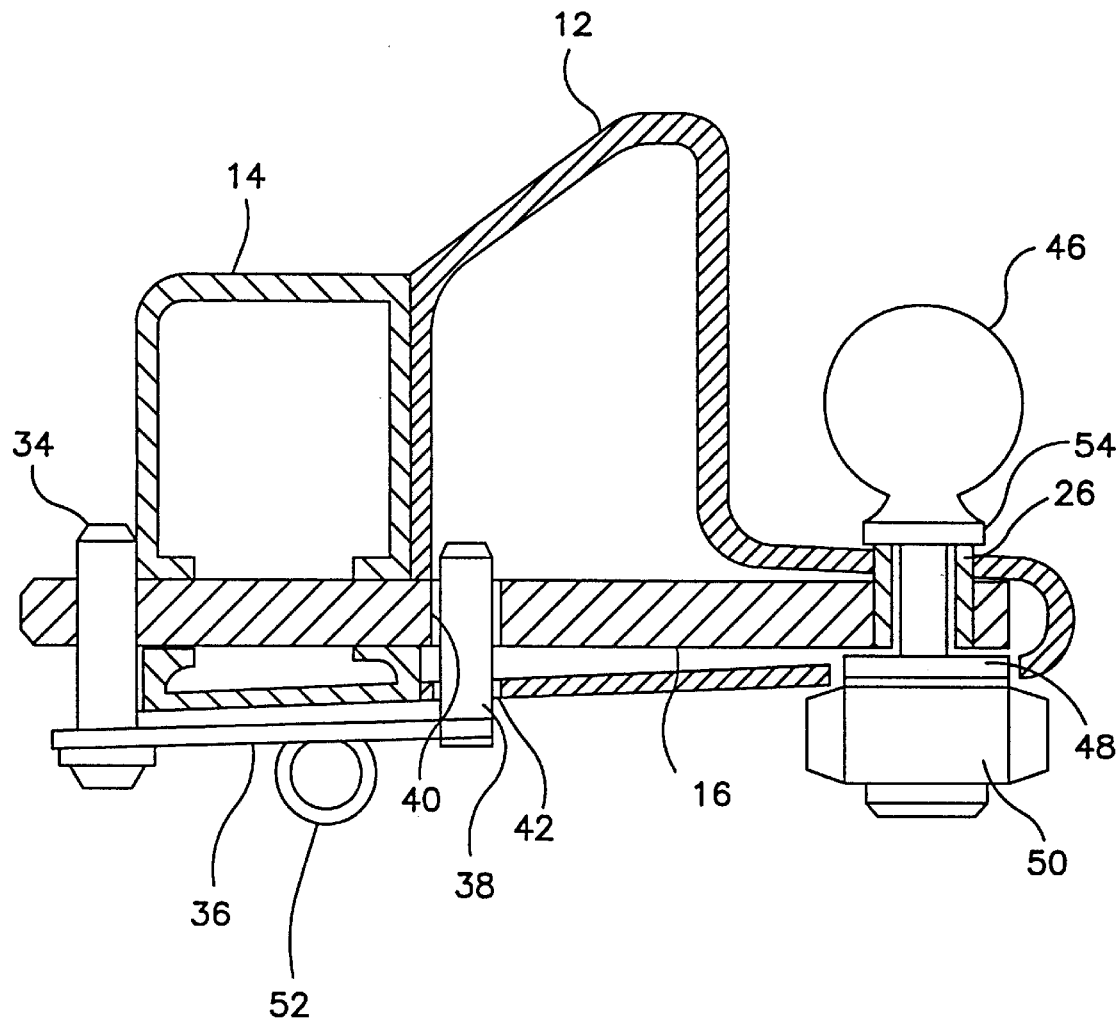
FIG. 3 illustrates in cross-sectional view an exemplary embodiment consistent with the present invention configured in towing condition.

FIG. 3 illustrates the exemplary bumper system 10 configured for towing. During towing, in order to prevent the forward movement of the tow bar 16 during braking, or while traveling down an incline, the tow bar 16 must be locked in place. Consistent with the present invention, during towing the tow bar 16 may be locked against forward travel using the locking pin 38. The locking pin 38 is engaged in the locking hole 40 by deflecting the spring clip 36 using the pull loop 52, pivoting the spring clip 36 about the axis of the stop pin 34, and engaging the locking pin 38 through orifice 42 in the bumper 12 and into the locking hole 40. The locking pin 38 is retained in the locking hole 40 by the upward spring force of the spring clip 36.

Towing may be accomplished using a standard hitch ball 46 installed in the hitch ball mounting hole 28. The hitch ball 46 is secured in the hitch ball mounting hole 28 using a washer 48 and a nut 50. Damage to the bumper 12 resulting from over tightening the nut 50 is prevented by the torque sleeve 26. When the hitch ball 46 is installed, the rim 54 of the hitch ball 46 bears on the torque sleeve 26, which is formed from a crush resistant material, preferably a metallic material.

Consistent with the above description, when the bumper system 10 is configured for towing as illustrated in FIG. 3, the bumper/towing system of the present invention provides a strong and secure towing assembly. The weight of the item to be towed is supported by the tow bar 16 which is in turn supported by the cross bar 14, and therethrough by structural components of the vehicle. The stop pin 34 prevents the tow bar 16 from pulling out of the cross bar 14, e.g. when accelerating or ascending an incline. In a similar manner the locking pin 38 prevents the tow bar 16 from sliding forward as during braking or descending an incline. Once towing is completed, the locking pin 38 is removed, and the bumper/towing system is returned to the energy management configuration illustrated in FIG. 1 and described above.

Although this invention has been disclosed and illustrated with reference to particular embodiments, the principles involved are susceptible for use in numerous other embodiments which will be apparent to persons of ordinary skill in the art. Accordingly, the invention is, therefore, to be limited only as indicated by the scope of the appended claims.

What is claimed is:

1. A towing system for connecting a vehicle to an object to be towed comprising:
    (a) a tow bar; and
    (b) a bumper supported by a structural cross bar, wherein said bumper contains a section for positioning said tow bar within said bumper and wherein said tow bar positioned within said bumper, when in a non-towing configuration, is movable relative to said structural cross bar, and wherein said tow bar can also be configured into a non-slidable towing configuration, the bumper concealing the tow bar in the non-towing configuration and in the towing configuration.

2. The towing system of claim 1, wherein said tow bar contains a locking mechanism which locks said tow bar into the non-slidable towing configuration.

3. The towing system of claim 1, wherein said bumper contains a protruding section for concealing said tow bar.

4. A towing system for a vehicle comprising:
    a structural member secured to said vehicle;
    a bumper disposed adjacent to said structural member;
    a tow bar disposed within said bumper and slidable within said structural member, said tow bar having a first stop preventing sliding removal from said structural member in the direction of said bumper, and a second stop releasably preventing sliding movement of said tow bar in the direction of said structural member.

5. The towing system of claim 4, wherein said structural member is a cross beam oriented transverse to the axis of the vehicle.

6. The towing system of claim 4, wherein said structural member is a mounting bracket.

7. The towing system of claim 4, wherein said bumper comprises energy absorbing foam material.

8. The towing system of claim 4, wherein said tow bar is slidably received within an opening in said structural member.

9. The towing system of claim 4, wherein said first stop comprises a first pin through said tow bar, and said second stop comprises a second, removable pin through said tow bar.

10. The towing system of claim 4, wherein said tow bar contains a mounting feature comprising a hole extending through said tow bar and said bumper.

11. The towing system of claim 4, wherein said bumper is attached to said structural member.

12. A towing system for connecting a vehicle to an object to be towed comprising:
    (a) a tow bar; and (b) a bumper supported by a structural cross bar, wherein said bumper contains a section for positioning said tow bar within said bumper and wherein said tow bar positioned within said bumper, when in a non-towing configuration, is movable relative to said structural cross bar, and wherein said tow bar can also be configured into a non-slidable towing configuration, the bumper concealing the tow bar in the non-towing configuration and in the towing configuration, wherein said tow bar contains a locking mechanism which locks said tow bar into the non-slidable towing configuration and wherein said locking mechanism comprises an opening disposed in the tow bar and a locking pin disposed in said opening.

13. A towing system for connecting a vehicle to an object to be towed comprising:

(a) a tow bar; and (b) a bumper supported by a structural cross bar, wherein said bumper contains a section for positioning said tow bar within said bumper and wherein said tow bar positioned within said bumper, when in a non-towing configuration, is movable relative to said structural cross bar, and wherein said tow bar can also be configured into a non-slidable towing configuration, the bumper concealing the tow bar in the non-towing configuration and in the towing configuration, wherein said bumper contains a protruding section for concealing said tow bar, wherein said protruding section of said bumper contains an opening and said tow bar contains an opening, wherein said opening in said tow bar and said bumper, when aligned, therein providing a position for attachment of a hitch.

14. A towing system for connecting a vehicle to an object to be towed comprising:

(a) a tow bar; and (b) a bumper for housing the tow bar, the bumper supported by a structural cross bar, the tow bar configureable in a towing configuration and a non-towing configuration, in the non-towing configuration the tow bar is capable of sliding linearly relative to the structural cross bar and in the towing configuration the tow bar is prevented from sliding relative to the structural cross bar.

15. The towing system of claim 14, wherein the bumper conceals the tow bar in the non-towing configuration and in the towing configuration.

* * * * *